(12) United States Patent
Hovén et al.

(10) Patent No.: US 9,188,186 B2
(45) Date of Patent: Nov. 17, 2015

(54) PRESSURE REGULATOR COMPRISING AN ACTUATOR

(75) Inventors: Arnold Hovén, Jonkoping (SE); Sonsterod Lars, Sandared (SE)

(73) Assignee: ÖHLINS RACING AB, Upplands Vasby (SE)

( * ) Notice: Subject to any disclaimer, the term of this patent is extended or adjusted under 35 U.S.C. 154(b) by 699 days.

(21) Appl. No.: 13/380,378

(22) PCT Filed: Jun. 22, 2010

(86) PCT No.: PCT/EP2010/058809
§ 371 (c)(1), (2), (4) Date: Apr. 10, 2012

(87) PCT Pub. No.: WO2010/149652
PCT Pub. Date: Dec. 29, 2010

(65) Prior Publication Data
US 2012/0186924 A1    Jul. 26, 2012

(30) Foreign Application Priority Data
Jun. 25, 2009    (SE) ...................................... 0900870

(51) Int. Cl.
*F16F 9/34*    (2006.01)
*F16F 9/46*    (2006.01)

(52) U.S. Cl.
CPC . *F16F 9/34* (2013.01); *F16F 9/464* (2015.04); *Y10T 137/7793* (2013.01)

(58) Field of Classification Search
CPC ............. F16F 9/46; F16F 9/464; F16F 9/466; F16F 9/34; B60G 2600/22; B60G 2600/26
USPC .............. 188/322.13, 266, 267, 266.5, 322.2, 188/319.1; 251/129.02, 129.07, 50; 355/270
See application file for complete search history.

(56) References Cited

U.S. PATENT DOCUMENTS

| 5,398,787 A | 3/1995 | Woessner et al. |
| 5,937,975 A | 8/1999 | Forster |
| 6,044,939 A | 4/2000 | Forster |
| 6,269,918 B1 * | 8/2001 | Kurusu et al. ............... 188/266.6 |
| 6,792,975 B2 * | 9/2004 | Erickson et al. ......... 137/625.65 |
| 7,448,479 B2 * | 11/2008 | Fukuda et al. .............. 188/322.2 |

(Continued)

FOREIGN PATENT DOCUMENTS

| DE | 2655811 A1 | 6/1978 |
| DE | 102006016473 A1 | 6/2007 |

(Continued)

OTHER PUBLICATIONS

International Search Report re International Application No. 0900870-7 dated Dec. 11, 2009, in 10 pages.

(Continued)

*Primary Examiner* — Vishal Sahni
(74) *Attorney, Agent, or Firm* — Knobbe, Martens, Olson & Bear, LLP

(57) ABSTRACT

A pressure regulator is provided for adjusting a pressure in a hydraulic flow, which pressure can be at least partially regulated using a solenoid. The solenoid can adjust a position of a driver that comprises a solenoid armature, a solenoid armature rod, and a delimiting part. The solenoid armature can be arranged around a solenoid armature rod and can be axially displaceable inside a solenoid chamber in a housing. The solenoid armature rod can have one or more holes that fluidly interconnect a first chamber to a solenoid chamber of the regulator. The delimiting part can be arranged around the solenoid armature rod adjacent to the housing and be configured such that clearances between the delimiting part, the solenoid armature rod, and the housing enable a certain radial movement between the driver and the housing.

14 Claims, 2 Drawing Sheets

(56) References Cited

U.S. PATENT DOCUMENTS

| | | | |
|---|---|---|---|
| 8,413,685 B2 * | 4/2013 | Okamoto | 137/625.69 |
| 8,556,049 B2 * | 10/2013 | Jee | 188/322.13 |
| 8,770,363 B2 * | 7/2014 | Sonsterod et al. | 188/322.13 |
| 2001/0002639 A1 * | 6/2001 | Nezu | 188/319.1 |
| 2006/0054434 A1 * | 3/2006 | Fukuda et al. | 188/313 |
| 2007/0034464 A1 | 2/2007 | Barefoot | |
| 2008/0116024 A1 | 5/2008 | Heyn et al. | |

FOREIGN PATENT DOCUMENTS

| | | |
|---|---|---|
| EP | 608427 A1 | 8/1994 |
| EP | 1914442 A2 | 4/2008 |
| JP | 09112621 | 5/1997 |
| JP | 11013816 | 1/1999 |
| JP | 2005/023966 | 1/2005 |
| SE | 0701748-6 | 12/2008 |
| WO | WO 2006/135319 A1 | 12/2006 |
| WO | WO 2009/157841 A1 | 12/2009 |
| WO | WO 2010/149652 A1 | 12/2010 |

OTHER PUBLICATIONS

International Search Report dated Sep. 25, 2009 of PCT/SE2009/000319 which is the parent application—4 pages.

* cited by examiner

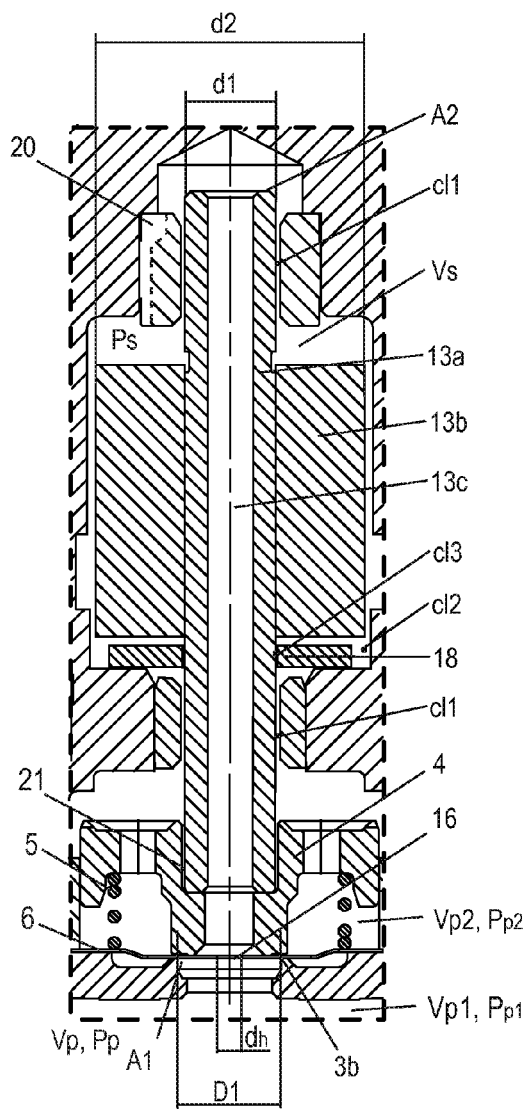
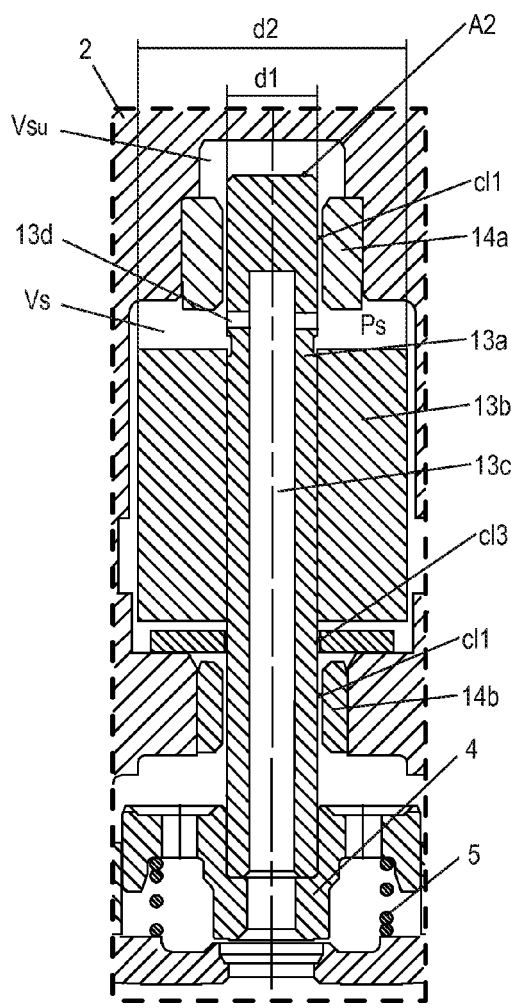
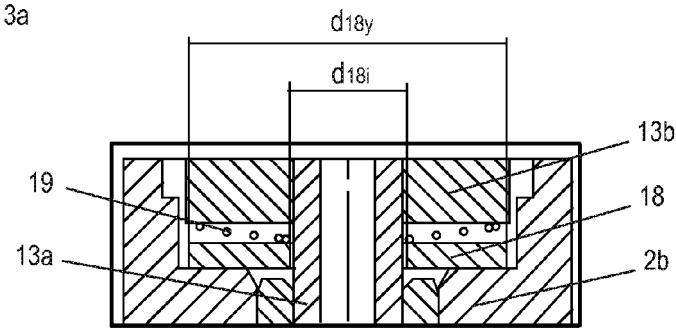
Fig 3a
Fig 3b
Fig 3c

PRESSURE REGULATOR COMPRISING AN ACTUATOR

CROSS-REFERENCE TO RELATED APPLICATIONS

This application is a national stage application under 35 U.S.C. §371 of PCT Application No. PCT/EP2010/058809 designating the United States, filed Jun. 22, 2010. The PCT Application was published in English as WO 2010/149652 A1 on Dec. 29, 2010 and claims the benefit of the earlier filing date of Swedish Patent Application No. 0900870-7, filed Jun. 25, 2009. The contents of Swedish Patent Application No. 0900870-7 and International Application No. PCT/EP2010/058809 including the publication WO 2010/149652 A1 are incorporated herein by reference in their entirety.

BACKGROUND

1. Field of the Inventions

The inventions relate to an electrically controlled pressure regulator, which comprises an actuator in the form of a solenoid primarily intended to determine the pressure in a damping medium flow between the damping chambers of a shock absorber.

2. Description of the Related Art

A known design within the field of the inventions is described by patent SE531108 of the Applicant, in which the closing actuating force of a pilot stage in a shock absorber valve is determined by the force from an electrically controlled solenoid.

In this patent application, a valve/pressure regulator is described in the form of a pilot-controlled two-stage valve, intended to control a damping medium flow between the two damping chambers of a hydraulic shock absorber. The shock absorber valve comprises a valve housing having at least one main valve with a movable valve part in the form of a main cone disposed between a main valve spring arrangement and a seat, as well as a pilot valve comprising a pilot slide. The main cone delimits a pilot chamber in the valve housing, in which the valve main spring and the pilot slide are disposed. The characteristics of the shock absorber valve are primarily controlled by the pressure build-up in the pilot chamber that is adjusted by the position of the pilot slide in the pilot chamber. The position is determined by the force balance between the spring force of a pilot spring and the counter actuating force from an electrically controlled solenoid, but also by the feedback pressure opening force created by the pressure in the pilot chamber. Energization of the solenoid adjusts the position of a driver or a solenoid armature having a solenoid armature rod disposed inside a solenoid chamber in the solenoid. The solenoid chamber is pressurized by virtue of the fact that a longitudinal and a transverse hole run in the solenoid armature rod and connect the pilot chamber to the solenoid chamber. As a result of different diameters of the upper and lower part of the pilot slide, a certain damping of the movement of the pilot slide is created.

The pressurization of the solenoid chamber causes damping medium to flow through the solenoid that thus can become more sensitive to dirt. Precise tolerances between the solenoid armature rod and the valve housing are therefore required to enable dirt insensitivity to be attained. Precise tolerances can lead to high production costs and a certain undesirable friction.

SUMMARY

Certain embodiments reduce the friction and the production costs in a pressure regulator regulated by a solenoid.

Certain embodiments also create a pressure regulator having a robust construction that is relatively insensitive to tolerances.

Certain embodiments further create a pressure regulator having minimized sensitivity to fouling.

In certain embodiments, the pressure regulator adjusts the pressure in a hydraulic flow between a first and a second chamber. The pressure is partially or wholly regulated by an energization of a solenoid that adjusts a position of a driver. The driver comprises a solenoid armature arranged around or integrated with a solenoid armature rod and is axially displaceable inside a solenoid chamber in a housing. The solenoid chamber is pressurized with a solenoid chamber pressure by virtue of the fact that one or more holes in the solenoid armature rod connect the first chamber to the solenoid chamber.

BRIEF DESCRIPTION OF THE DRAWINGS

FIG. 3a shows an embodiment of the solenoid-controlled driver of the pressure regulator.

FIG. 3b shows another embodiment of the solenoid-controlled driver of the pressure regulator.

FIG. 3c shows a detailed view of yet another embodiment of the solenoid-controlled driver of the pressure regulator.

DETAILED DESCRIPTION

Figure 1:
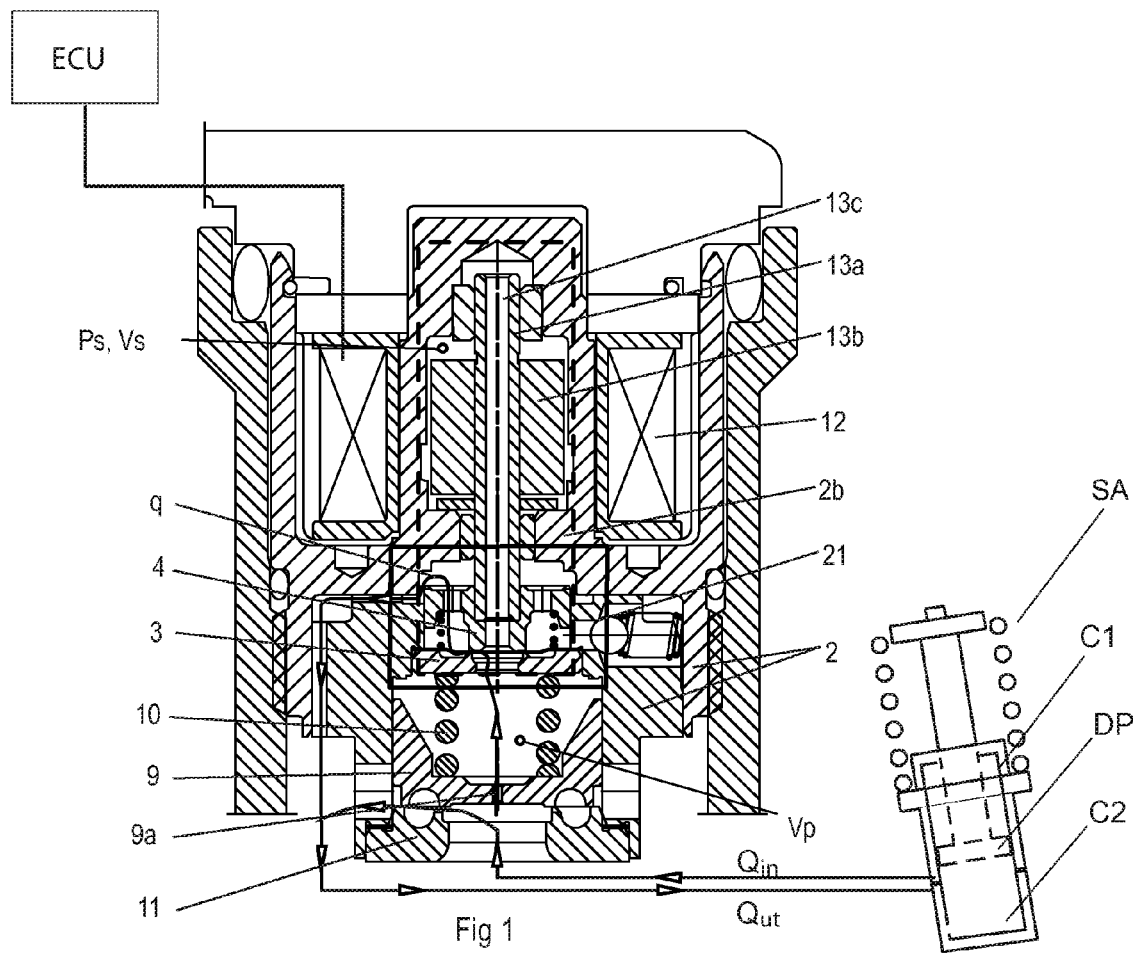
FIG. 1 shows an embodiment of a pressure regulator connected to a shock absorber.

FIG. 1 shows an embodiment of a shock absorber valve connected to a hydraulic shock absorber SA for a vehicle in which the valve controls the pressure in a damping medium flow $Q_{in}$, $Q_{out}$ into, out of or between the two damping chambers C1, C2 of the shock absorber. The flow between the two damping chambers occurs through displacement of a main piston DP that is disposed in the damper body and delimits the two damping chambers C1, C2. The flow of the damping medium in the valve is primarily determined by the speed of the main piston DP and by the piston and piston rod diameters thereof. The valve is a one-way valve, in which the flow $Q_{in}$ goes into the valve and the flow $Q_{out}$ goes out of the valve, i.e. the damping medium flow takes the same path and flows in a direction irrespective of the direction in which the main piston DP moves in the damper body. The pressure is adjusted via an ECU-controlled continuous electric signal that controls the current supply to the valve according to working principles described in EP 0 942 195.

The embodiment of the shock absorber valve in FIG. 1 includes a valve housing 2 comprising at least one main valve having an axially movable main cone 9. The main cone 9 is biased by a main valve spring 10 against a main seat 11. The main cone 9 is also arranged such that it delimits a pilot chamber $V_p$ in the valve housing 2. The main valve spring 10, and a pilot valve cone 4 and a pilot valve seat 3 are disposed in the pilot chamber $V_p$.

The main flow $Q_{in}$ creates a pressure on the main cone 9 that contributes to a regulator force R that opens the valve, i.e. forces the main cone 9 from the main seat 11. Once the valve has opened, the main flow goes via the regulatable flow opening that arises between the main seat 11 and the main cone 9 in the direction $Q_{in}$ to $Q_{out}$, or in through a hole 9a in the main cone 9 into the pilot chamber $V_p$. The valve is preferably a two-stage, pilot-controlled valve, which means that the force that opens the main valve is dependent on the pilot pressure $P_p$ which arises in the pilot chamber $V_p$.

The characteristics of the shock absorber valve are thus mainly controlled by a pressure regulator that adjusts a hydraulic flow between a first chamber $V_{p1}$ and a second chamber $V_{p2}$. The flow between the chambers is regulated partially or wholly by energization of a solenoid that adjusts an axial position of a driver in relation to a housing. The driver per se is connected to and adjusts the position of an axially movable cone in relation to a seat.

Figure 2:
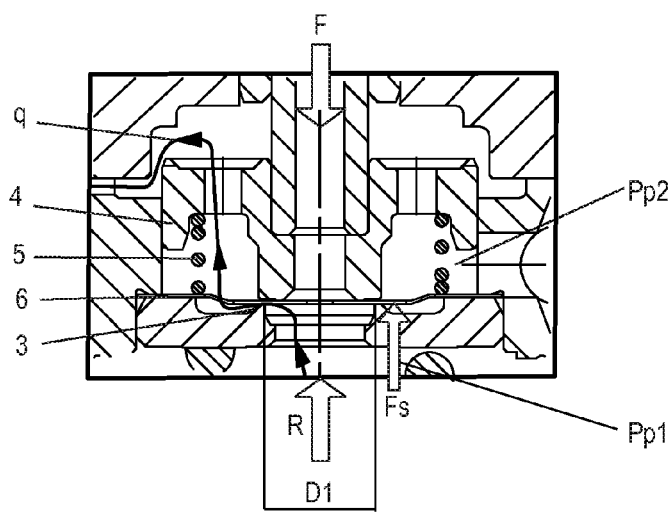
FIG. 2 shows a detailed view of those parts of the pressure regulator embodiment that are movable in relation to one another and between which a hydraulic flow can pass.

In this case, the pressure regulator adjusts the pressure in a pilot chamber $V_p$, i.e. the flow between the first and the second pilot valve chamber $V_{p1}$, $V_{p2}$, by adjusting the position of a pilot valve cone 4 in relation to a pilot valve seat 3, see FIG. 2.

The mutual relationship of the pilot valve cone 4 and the pilot valve seat 3 creates a regulatable flow opening arranged to restrict a pilot damping medium flow q. The regulatable flow opening, which has a flow diameter defined by the measure D1, creates a restriction of the flow q that produces a pressure difference between the pressures $P_{p1}$, $P_{p2}$ that arises upstream and downstream respectively of the restriction. This pressure difference can be close to 10 bar. The size of the flow opening and the position of the pilot valve cone 4 in the pilot chamber $V_p$ are determined by a force balance on the pilot valve cone 4. The force balance is primarily created by the sum of an actuating force F and the force Fs from a spring arrangement against the action of the regulator force R created by the main flow $Q_{in}$. The spring arrangement comprises, for example, a first and/or a second spring 5, 6, which can be configured as helical springs and/or washer-shaped shim springs. In FIGS. 1 and 2, the first spring 5 is a helical spring and the second spring 6 is a shim spring.

The actuating force F is created by an electrically controlled solenoid 12 arranged to regulate the position of the pilot valve cone 4 in relation to the pilot valve seat 3 via a driver 13 that is axially movable in the valve housing 2 and comprises a solenoid armature rod 13*a* and a solenoid armature body 13*b*.

In FIGS. 3*a* and 3*b* is shown an enlarged view of embodiments of the driver 13 and its parts. The solenoid armature rod 13*a* has a diameter d1 that is smaller than the diameter d2 of the solenoid armature body 13*b*. When the solenoid armature rod 13*a* is axially displaced, it slides against an upper and a lower plain bearing 14*a*, 14*b* disposed in the valve housing 2. Between the plain bearings 14*a*, 14*b* and the rod 13*a* there is, for production engineering reasons (i.e., from a manufacturing point of view), a first clearance cl1 of a predetermined size. The size of this first clearance cl1 contributes, inter alia, to a reduced friction and helps to possibly reduce the tolerance requirements of the solenoid armature rod 13*a* and the valve housing 2.

In FIG. 3*a*, a hole 13*c* extends, parallel with the axis of symmetry of the rod 13*a*, through the whole of the solenoid armature rod 13*a*. Through this hole 13*c*, damping medium can pass to a solenoid chamber $V_s$ that is disposed in the valve housing 2 within the interior of the solenoid 12. The damping medium flows through the hole 13*c*, so that the solenoid chamber $V_s$ is pressurized with a solenoid chamber pressure $P_s$. Due to a large diameter of the hole 13*c*, the restriction of the damping medium flow between the pilot chamber $V_p$ and the solenoid chamber $V_s$ is sufficiently small that the solenoid chamber pressure $P_s$ is substantially as great as the pilot pressure $P_p$.

When a shim spring is used as the second spring 6, as shown in FIGS. 1, 2 and 3*a*, a hole 16 of diameter $d_h$ can be disposed in the center thereof that allows damping medium to flow through the axial hole 13*c* in the solenoid armature rod 13*a* with little or no restriction. A small restriction can result in a certain damping of the movements of the driver 13.

The size of the actuating force F that acts counter to the total force Fs of the spring arrangement is limited for, for example, flow limitation and spatial reasons, i.e. the solenoid design. That is to say, the difference between the forces Fs from the spring arrangement and the actuating force F limits how high the pilot pressure $P_p$ can be. In one embodiment, in order to increase the maximum level of the pilot pressure, the area, referred to as the total pressure feedback area A, that is acted upon by the pilot pressure is reduced. The total feedback area A is determined by the difference between a first and a second area; A1-A2. A1 is the effective first area of diameter D1 that is acted upon by the pilot pressure $P_p$, in this case determined by the seat diameter D1 of the regulatable flow opening which restricts the pilot damping medium flow q. A2 is the effective second area, determined by the diameter d1 of the solenoid rod 13*a*, that is acted upon by the solenoid chamber pressure $P_s$. Around other parts disposed in the solenoid chamber, substantially the same pressure $P_s$ prevails, which means that they do not contribute to any change in static force. Thus $A = \pi \ast (D1^2 - d1^2)/4$.

The pressure feedback area A does not have any lower size limit since the diameters for the respective effective area can be freely chosen. Nor is there theoretically any upper limit for the height to which the pilot pressure $P_p$ can be adjusted. Preferably, only the seat diameter D1 defined by the inner seat edge 3*b* is used to determine the pressure feedback area. To be able to choose a large number of pressure ranges merely by the choice of one dimension of a component has great significance for the production costs for certain embodiments. In certain embodiments, the pressure feedback is possible by virtue of the hydraulic connection of the pilot chamber $V_p$ and the solenoid chamber $V_s$ via the hole 13*c* in the solenoid armature rod 13*a*. In some embodiments, in order to increase this pressure feedback or differential feedback, as it may also be called, a groove 20 can be disposed in the upper plain bearing 14*a*. The groove offers greater possibilities for the hydraulic medium to flow from the pilot to the solenoid chamber without restriction. The groove 20 is shown with a dashed line in FIG. 3*a*.

In some embodiments, a delimiting part in the form of a washer 18 is arranged around the solenoid armature rod 13*a* adjacent to the valve housing 2. The washer 18 has a suitably small third clearance cl3 between its inner diameter $d_{18i}$ and the solenoid armature rod 13*a*, and a second, larger clearance cl2 between its outer diameter $d_{18y}$ and the housing 2. The second clearance cl2 corresponds to or is larger than the first clearance cl1 between the solenoid armature rod 13*a* and the valve housing 2, preferably up to three times larger, but this relationship can vary. As a result of this relationship between the clearances, a certain radial movement is permitted between the driver and the housing 2. Moreover, a play 21 is also permitted between the solenoid armature rod 13*a* and the pilot valve cone 4, which results in no transfer of lateral forces from the solenoid to the valve housing 2.

In certain embodiments, the third clearance cl3 is as small as possible from a production engineering aspect and preferably has a size of between a maximum clearance of 6/1000 and a minimum clearance of 1/1000 of the outer diameter d1 of the solenoid rod, i.e. a fit between the outer diameter d1 of the solenoid rod and the housing 2 that is between H7/g6 and optimally H6/g5, maximally H6/f5. As a result of having a minimal third clearance cl3 between the inner diameter of the washer 18 and the solenoid armature rod 13*a*, very little damping medium flows through the hole 13*c* in the solenoid armature rod 13a, via the solenoid chamber $V_s$ and to the downstream pilot chamber $V_{p2}$. A small clearance cl3 helps attain low leakage through the inner, dirt-sensitive parts of the solenoid.

The washer 18 bears against the valve housing 12 adjacent to the lower plain bearing 14b. The contact surface between the valve housing 2 and the washer 18 is kept shut and seals, regardless of the operating situation. This by virtue of the fact that the oil works with a sticking force, at the same time as the washer 18 is acted upon by the solenoid chamber pressure Ps, which compresses the washer 18 against the valve housing 2. The pressing force is created by a pressure difference over the washer 18 that arises by virtue of the fact that the second pilot pressure $P_{p2}$, downstream of the restriction between the pilot valve seat 3 and the pilot valve cone 4, is significantly less than the solenoid chamber pressure $P_s$, which is substantially equal to the first pilot pressure $P_{p1}$.

In FIG. 3b is shown an alternative embodiment in which the axially extending hole 13c through the solenoid armature rod 13a is no longer continuous, but is terminated such that a second part of the solenoid armature rod having the upper area A2 and diameter d1 is solid. The hole 13c thus extends only through a first part of the solenoid armature rod 13a. In order to lead damping medium into the solenoid chamber $V_s$ and still create a pressure-balanced solenoid armature 13b, the axial hole 13c is terminated in radial holes 13d extending between the hole 13c in the solenoid armature rod and the solenoid chamber $V_s$. In this embodiment, the solenoid armature rod 13a operates as an extra damping piston in the limited space in the form of an upper solenoid chamber $Vs_u$ disposed above the solenoid armature rod 13a. The damping is created by virtue of the fact that the damping medium in the upper solenoid chamber $Vs_u$ that is dispelled by the solenoid armature rod 13a, is forced to flow through the first gap cl1 and out into the solenoid chamber $V_s$.

In addition, in this FIG. 3b, the spring arrangement that creates the spring force $F_s$ is replaced by a single helical spring 5. The spring arrangement that is shown in FIGS. 1-3a can also be used in this embodiment. The hole 16 in the second shim spring 6 then creates an extra damping in series with the damping movement of the solenoid armature rod in the space $Vs_u$.

In another embodiment, a further pressing pressure can be created by the arrangement of a spring 19, see FIG. 3c, between the washer 18 and the solenoid armature body 13b. The spring 19 works with low force, which can be somewhat greater than the own weight of the washer 18, and with low spring constant, in order not to otherwise affect the valve function. The spring 19 may be either configured as a helical spring 19—straight or conically or as a shim spring/cup spring with bent-up arms. Another alternative embodiment is that the washer 18 itself both seals and is springy and can then have a shim-like character, for instance, in the form of a thin washer with bent-up arms.

The inventions are not limited to the embodiments that are shown above by way of example, but instead can be modified within the scope of the following patent claims and the inventive concept. For example, the solenoid-controlled pressure regulator can, of course, be used in controlling other than pilot pressure in a shock absorber valve and can also be used in other types of valves, such as various types of one-way or non-return valves biased by springs.

The invention claimed is:

1. A pressure regulator for adjusting the pressure in a hydraulic flow between a first chamber and a second chamber, wherein the pressure is at least partially regulated by an energization of a solenoid which adjusts a position of a driver, the said driver comprising:
   a solenoid armature arranged around a solenoid armature rod and being axially displaceable inside a solenoid chamber in a housing,
   one or more holes in the solenoid armature rod connecting the first chamber to the solenoid chamber;
   a delimiting part arranged around the solenoid armature rod adjacent to the housing, and wherein the delimiting part has a third clearance between its inner diameter and the outer diameter of the solenoid armature rod, and a second clearance, larger than the third clearance, between its outer diameter and the housing, wherein the second clearance allows radial movement between the delimiting part and the housing and is equal to or is larger than a first clearance between the outer diameter of the solenoid armature rod and the housing, wherein the first clearance allows radial movement between the solenoid armature rod and the housing so that a certain radial movement is permitted between the driver and the housing.

2. The pressure regulator of claim 1, wherein the third clearance has a size of between a maximum clearance of $6/1000$ and a minimum clearance of $1/1000$ of the outer diameter of the solenoid rod.

3. The pressure regulator of claim 1, wherein the delimiting part is configured to bear against the housing such that an opening between a contact surface of the housing and the delimiting part is closed in response to a pressing force from a solenoid chamber pressure exerted against the delimiting part.

4. The pressure regulator of claim 3, wherein the pressing force on the delimiting part is created by a pressure difference between a second chamber pressure and the solenoid chamber pressure.

5. The pressure regulator of claim 4, further comprising a spring disposed between the delimiting part and the solenoid armature body for providing a further pressing pressure against the delimiting part to urge the delimiting part against the contact surface of the housing.

6. The pressure regulator of claim 1, wherein the solenoid chamber and the first chamber are fluidly interconnected such that a solenoid chamber pressure in the solenoid chamber is substantially equal to a first pressure in the first chamber due to substantially unrestricted hydraulic flow between the solenoid chamber and the first chamber via said one or more holes connecting the solenoid chamber and the first chamber.

7. The pressure regulator of claim 6, wherein a fluid interconnection of the solenoid chamber and the first chamber comprises an axial hole extending through an entire length of the solenoid armature rod.

8. The pressure regulator of claim 1, wherein the pressure regulator regulates a pilot pressure in a shock absorber valve.

9. The pressure regulator of claim 8, wherein the pressure regulator regulates the pilot pressure to determine a main damping medium flow over a main valve of the shock absorber valve, the main valve comprising a main cone that moves axially in relation to a main seat counter to the action of at least a first main valve spring.

10. The pressure regulator of claim 7, wherein a second part of the solenoid armature rod is arranged to move axially in an upper solenoid chamber, the upper solenoid chamber extending axially above the solenoid armature rod and being axially separated from the solenoid chamber, wherein movement of the second part of the solenoid armature rod is damped due to fluid flow between the upper solenoid chamber and the solenoid chamber.

11. The pressure regulator of claim 10, wherein the upper solenoid chamber is fluidly interconnected to the solenoid chamber via a first gap between the solenoid armature rod and the housing.

12. The pressure regulator of claim 11, wherein the first gap is configured such that movement of the second part of the solenoid armature rod into the upper solenoid chamber dispels a hydraulic medium out of the upper solenoid chamber through the first gap and into the solenoid chamber.

13. The pressure regulator of claim 1, wherein the second clearance is provided radially outwardly of an outermost diameter of the delimiting part.

14. The pressure regulator of claim 1, wherein the first clearance is provided between the outer diameter of the solenoid armature rod and a bearing along which the solenoid armature rod is slidable.

\* \* \* \* \*